C. G. GRABO.
Straw Cutter.
No. 38,959. Patented June 23, 1863.
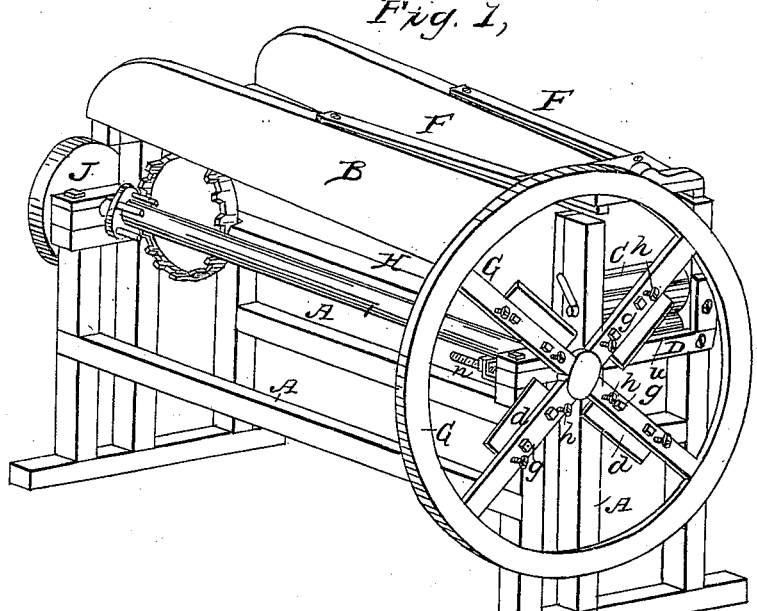
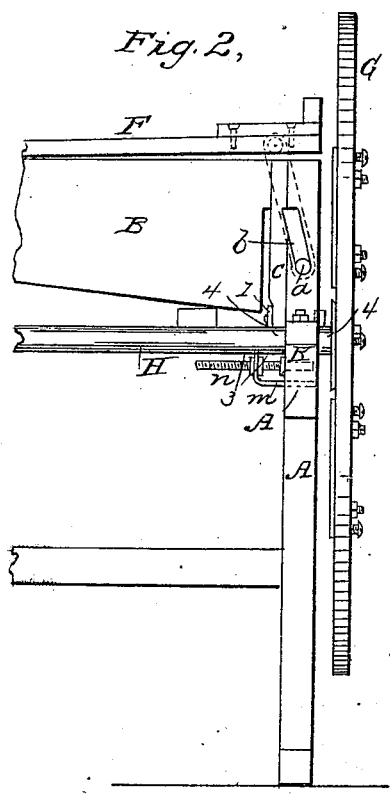
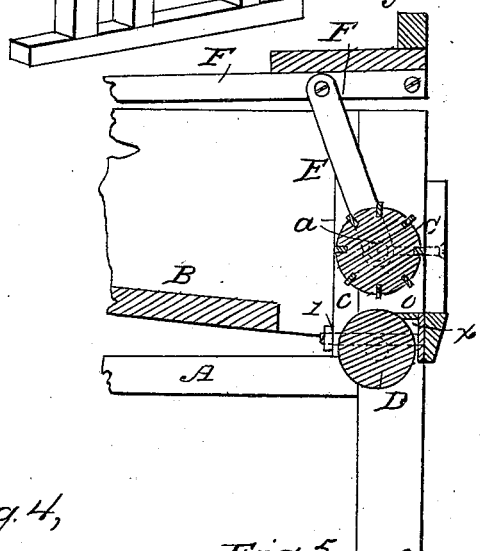
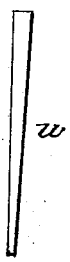
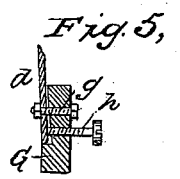
INVENTOR:
C. G. Grabo
by his attorneys
Dritzner & Cohen

UNITED STATES PATENT OFFICE.

CHRISTIAN G. GRABO, OF GREENFIELD, MICHIGAN.

IMPROVEMENT IN STRAW-CUTTERS.

Specification forming part of Letters Patent No. 38,959, dated June 23, 1863.

*To all whom it may concern:*

Be it known that I, C. G. GRABO, of the township of Greenfield, in the county of Wayne and State of Michigan, have invented a new Straw-Cutter; and I do hereby declare that the following is a full and exact description of said invention, reference being had to the accompanying drawings, in which—

Figure 1 represents a perspective view of said straw-cutter. Fig. 2 represents a side view of the front part of the same. Fig. 3 represents a longitudinal vertical section through the front part of the feed-box. Figs. 4 and 5 represent detached views, hereinafter to be referred to.

To enable others skilled in the art to make and use my invention, I will proceed to describe its construction and operation.

A represents the frame of the machine.

B represents the feed-box, in which the straw or hay is placed, which is fed to the cutters by means of the feed-rollers C and D, the latter being operated by gearing-belts, pulleys, or any other mechanical device. The upper feed roller, C, has its bearings in the hangers E, which are suspended from the wooden springs F, and which thus compress the straw as it passes between the rollers, the journals $a$ of the roller C turning in the oblique slot $b$ of the frame.

$u$ represents the bar or stationary cutter, on the outer edge of which the straw is cut. This bar is secured to the front of the feed-box and of the lower feed-roller, D, and an elastic material—such as india-rubber—$x$, is placed between the frame of the machine and the bar $u$, so that it may yield slightly. Thus when the edge of the bar $u$ or of the cutting-blades becomes imperfect by wear a perfect contact or shear motion is still obtained by so constructing the bar $u$ as to yield slightly to the pressure of the movable cutter-blades. For this purpose I also make the bar $u$ tapering toward the cutter-wheel, as represented in Fig. 4, so that the knives, if properly adjusted, may not strike the bar, but glide from the thinner end toward the thicker.

$o$ represents a small iron bar, which is secured in front of the lower feed-roller, D, between it and the cutter-bar $u$, so as to lie snugly against said feed-roller and to prevent any straw from lodging between the feed-roller and stationary cutter, which may clog the feed-roller.

G represents the cutter-wheel, to the arms of which the blades $d$ are secured. It turns on the horizontal shaft H, to which motion is imparted from the driving-pulley J. The blades $d$ are secured to the wheel G by means of screw-bolts $g$, but their positions toward the stationary bar $u$ may be adjusted with the greatest accuracy by means of the set-screws $h$, which bear on the rear edges of the cutter-blades, and the cutting-edge of each blade may thus be set to operate effectually on the bar $u$. When the cutters wear off uniformly, the position of the wheel and its cutters may be adjusted by means of the adjustable journal-box K in the following manner: the angular iron $m$ is secured to the frame A. The screw-shaft $n$, which passes through it, is secured to the journal-box K, and this can thus be adjusted by operating the screw-nuts 3, and as both sides of the journal-box K bear against shoulders 4 of the shaft H, said shaft may be adjusted in its longitudinal directions, and thus an adjustment of the cutter-wheel is effected.

Having thus fully described the nature of my invention, what I claim herein as new, and desire to secure by Letters Patent, is—

1. Interposing an elastic material, $x$, between the stationary cutter bar $u$ and the frame of the straw-cutter, substantially in the manner herein described.

2. The combination of the rotary cutter-wheel G with the stationary tapering cutter-bar $u$ and interposed elastic material $x$, substantially in the manner and for the purpose herein described.

3. In combination with the rotary cutting-wheel, the adjustable journal box K, for the purpose of adjusting the cutter-wheel toward the stationary cutting-edge $u$, substantially in the manner herein described.

4. In combination with the yielding and tapering stationary bar $u$, the adjustable cutting-blades $d$, substantially in the manner and for the purpose set forth.

CHRISTIAN G. GRABO.

Witnesses:
 EMIL SCHOBER,
 F. ROHNERT, Sr.